US005095604A

United States Patent [19]
Baker

[11] Patent Number: 5,095,604

[45] Date of Patent: Mar. 17, 1992

[54] FORKED WEDGE SEPARATORS

[76] Inventor: Jerry A. Baker, 232 High St., Ashland, Ohio 44805

[21] Appl. No.: 613,382

[22] Filed: Nov. 15, 1990

[51] Int. Cl.[5] .................... B23P 19/04

[52] U.S. Cl. .................... 29/239; 29/253; 29/275

[58] Field of Search .................... 254/15, 17, 131, 25, 254/104; 29/273, 239, 253, 275; 7/139, 166

[56] References Cited

U.S. PATENT DOCUMENTS

| | | | |
|---|---|---|---|
| 1,559,976 | 11/1925 | Neos | 254/131 |
| 1,595,930 | 8/1926 | Sieven | 29/273 |
| 1,719,311 | 7/1929 | Sargent . | |
| 1,946,063 | 2/1934 | Dodge . | |
| 2,473,866 | 6/1949 | Davies | 254/131 |
| 2,504,345 | 4/1950 | Nellis | 254/131 |
| 3,010,347 | 11/1961 | Kron | 7/139 |
| 3,286,561 | 11/1966 | Norman . | |
| 3,997,957 | 12/1976 | Tone et al. . | |
| 4,449,431 | 5/1984 | Branosson . | |
| 4,624,039 | 11/1986 | Lawrence et al. . | |
| 4,649,613 | 3/1987 | Bednarik . | |
| 4,653,357 | 3/1987 | Carlmark . | |

FOREIGN PATENT DOCUMENTS

| | | | |
|---|---|---|---|
| 603079 | 9/1925 | France | 29/273 |

*Primary Examiner*—Robert C. Watson
*Attorney, Agent, or Firm*—Jerry Semer

[57] ABSTRACT

This invention is a adjustable forked wedge separator. The invention basically consist of a handle that is integrally attached to the narrow edge of a truckcated triangular shaped body member. On the wide edge of the trunkcated triangular shaped body member are the wedge members. These members are flat on the bottom and of the same thickness as the body member at the bottom and taper to a point at the top end. In one embodiment of this invention one of these wedges is integral attached to the body member and the other wedge is adjustable. In this embodiment of the invention the means for adjusting the one wedge is a rack on the bottom of the adjustable wedge member and a helix shaped gear around the outside of the cylinder in an opening in the body member. The rack and the helix shaped gear engaged such that when the cylinder is turned the wedge moves. In another embodiment one or both wedges can be adjustable. In this embodiment the body member has slots on each side of the handle. In these slots are a bolt which has threads which are adapted to threadly engage wedge member. When an individual wishes to change the position of the wedge member he lossen the bolt moves the wedge and retighten it.

9 Claims, 3 Drawing Sheets

FORKED WEDGE SEPARATORS

FIELD OF THE INVENTION

The invention relates to forked wedge separators.

BACKGROUND OF THE INVENTION

Forked wedge separators have been used for many years to separated ball joints from spindle. Their greatest use is in the automobile industry where they are used to separate the tire rod ends and ball joints. The basic problem is that ball joints come in all different sizes; therefore, one needs several sizes of forked wedge separators to separate them. Thus a maintenance department of a large manufacturing company must have a large number of these forked wedge separators to work on the machines within the factory. This is expensive and there is a great deal of time lost when a maintenance man has to walk to the other side of the factory to find the proper size forked wedge separator. The adjustable forked wedge separator was invented to solve these problems.

The object of this invention is to eliminate the need for a mechanic to need a large number of different sized forked wedge separators to separate the many sizes of ball joints and spindles. The main feature of this invention is that the forked wedge separator's size is adjustable and therefore can be used with many different sized balljoints and spindles. The advantage of this invention is that the adjustable forked wedge separator replaces the need for having several non adjustable forked wedge separators.

Still further, objects and advantages will become apparent from consideration of the ensuing description and drawings.

SUMMARY OF THE INVENTION

This invention is a adjustable forked wedge separator. The invention basically consist of a handle that is integrally attached to the narrow edge of a trunckcated triangular shaped body member. On the wide edge of the trunkcated triangular shaped body member are the wedge members. These members are flat on the bottom and of the same thickness as the body member at the bottom and taper to a point at the top end. In one embodiment of this invention one of these wedges is integral attached to the body member and the other wedge is adjustable. In this embodiment of the invention the means for adjusting the one wedge is a rack on the bottom of the adjustable wedge member and a helix shaped gear around the outside of the cylinder in an opening in the body member. The rack and the helix shaped gear engaged such that when the cylinder is turned the wedge moves. In another embodiment one or both wedges can be adjustable. In this embodiment the body member has slots on each side of the handle. In these slots are a bolt which has threads which are adapted to threadly engage wedge member. When an individual wishes to change the position of the wedge member he lossen the bolt moves the wedge and retighten it.

DETAILED DESCRIPTION OF THE PREFERRED EMBODIMENT

Figure 1:
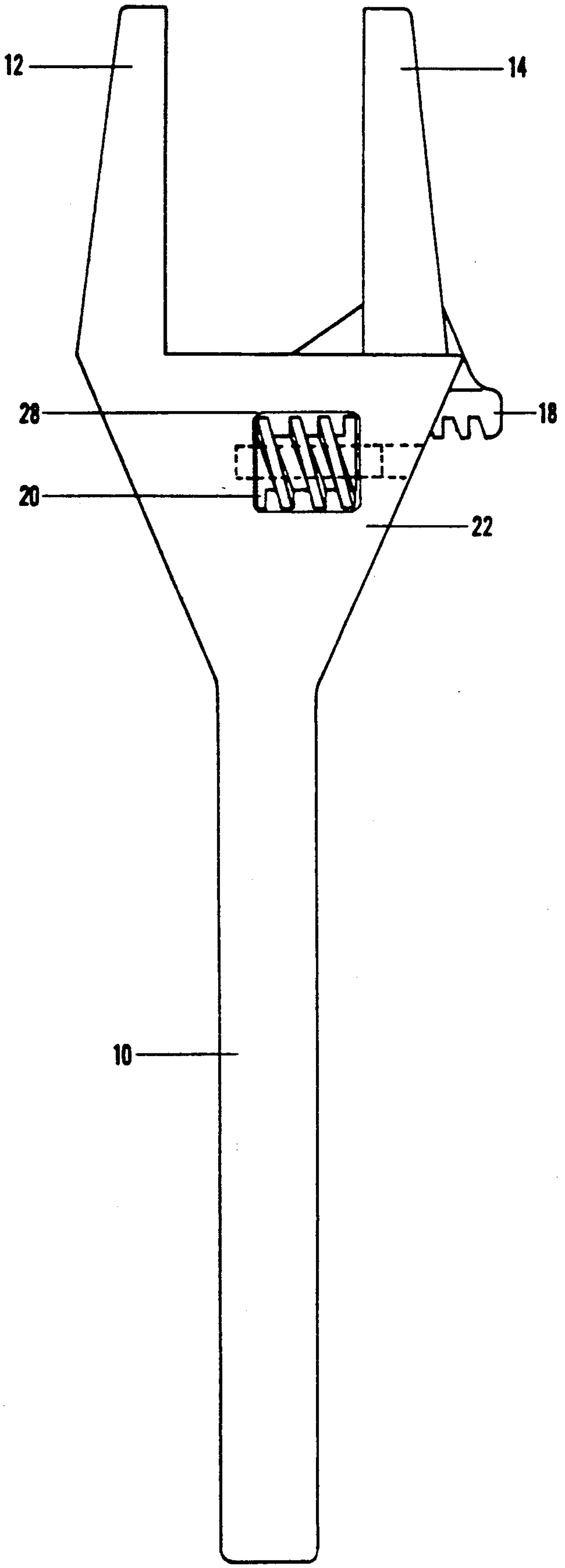
FIG. 1 shows the top view of one embodiment the adjustable wedge separator.

Reference is now made to the figures all of which like parts are designated by like reference numbers. Figure one shows the top view of one embodiment of the adjustable forked wedge separator. This figure shows the four main parts of the invention, the body member (22), the fixed wedge 12) the adjustable wedge (14) and the means for adjusting the adjustable wedge which is in this embodiment an adjusting cyclinder (20) that engages a rack (18).

Figure 2:
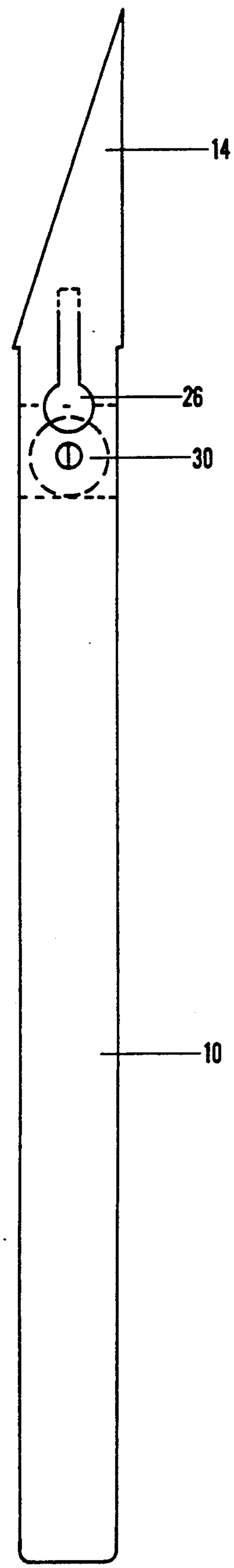
FIG. 2 shows the side view of one embodiment of the adjustable wedge separator.

FIG. 1 shows the body member 22) to be a flat truncated triangular shape member, which is in the preferred embodiment approximately four inches wide at the top and one inch wide at the narrow end. FIG. 2 shows that the body member (22) is flat and in the preferred embodiment approximately one inch thick. In the preferred embodiment, the body member 22) is made of metal; however a suitable hard, sturdy, non flexible substance that can take pounding with a hammer or twisting can be used. Attached to the narrow end of the body member 22; is the handle (10). In the preferred embodiment the handle (10; is integrally molded with the body member (22) until they become one piece; however the handle (10) could be welded to the body member (22) or attached to the body member (22) by any other method which would allow the connection to take the force applied by hammering the opposite end of the handle and by rocking it to separate a ball joint from the spindle. The handle (10) is cylindrical and in the preferred embodiment approximately 10 inches long and one inch in diameter. The handle must be made of a hard, sturdy, non-flexible substance since it will be pounded on end and in the preferred embodiment it is made of metal. The handle (10) is also directly in line with the wedges (12 and 14) so that a blow to the end of the handle (10; would be transfered efficiently to wedges (12 and 14) at the other end.

The fixed wedge member (12) is also integrally molded into the body member (22; for strength and sturdiness. It could also be welded or attached to the body member (22) by any other method which would make the connection sufficiently sturdy to take the force applied to it by hammering and from one rocking the invention to separate the ball joint from the spindle. FIG. 2 the side view of the invention, shows the shape of the adjustable wedge member 14. The fix wedge member (12) has the same shape as the adjustable wedge member (14). The fix wedge member (12) is as wide as the body member (22) at its connection point with the body member (22) and tapers to a point.

The adjustable wedge member (14) as stated above is similarly shaped as the fix wedge member (12), in that at its bottom it is as wide as the body member (22) and it tapers to a point at its top. The adjustable wedge member (14) has a flat bottom which fits up tight against the flat top of the body member (22) so that the force of hammering will be transfered efficiently to the adjustable wedge member (14) and the force applied to this member when rocking it to separate a ball joint from a spindle will not damage the forked wedge separator and will efficiently apply this force to the ball joint and spindle through the adjustable wedge member (14).

Figure 3:
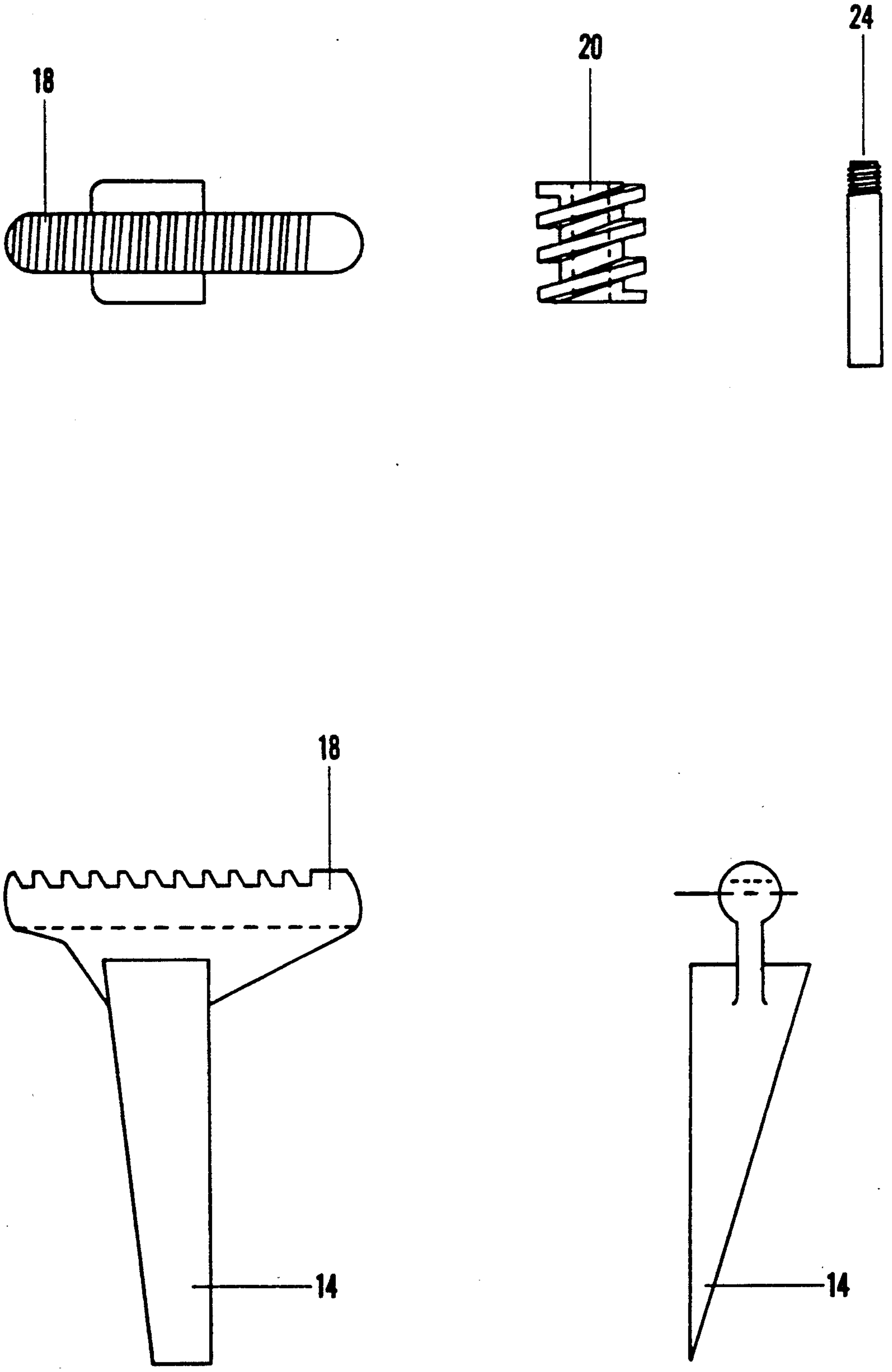
FIG. 3 shows the adjusting means of one of the embodiment of the invention. The adjusting means consisting of a bolt adjuster, adjustable wedge and adjustable cylinder.
Figure 4:
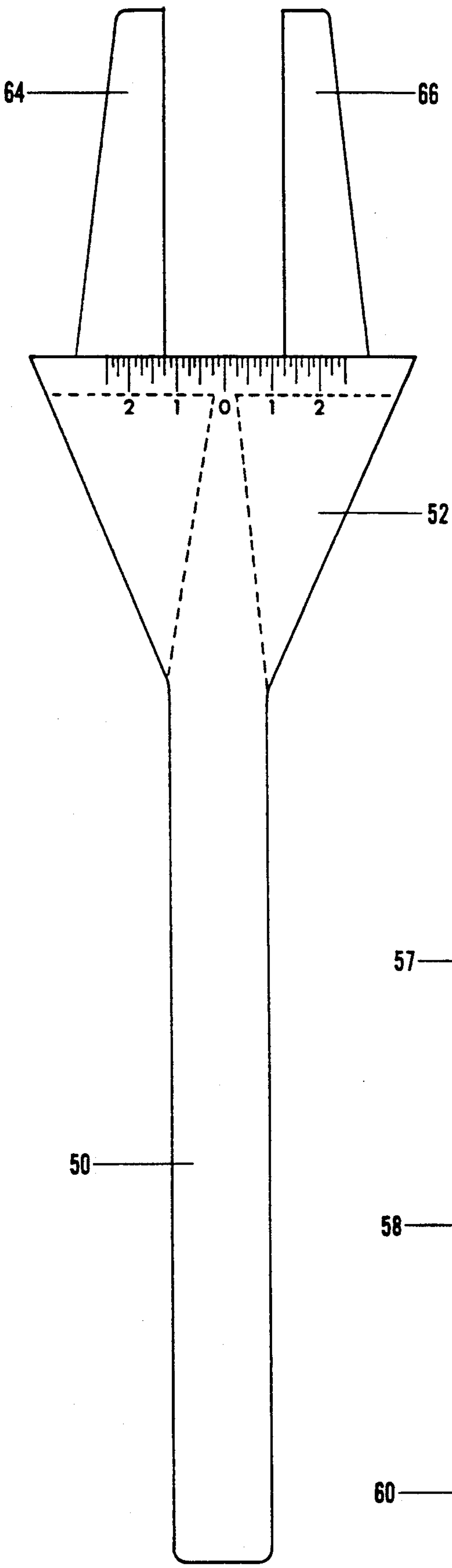
FIG. 4 shows the top view of another embodiment of the invention.

FIG. 3 shows the three basic parts of the means to adjust in this embodiment. These parts being a bolt (24) adjuster cylinder (20), and rack (18) The rack (18) is attached to the bottom of the adjustable wedge member (14). The teeth of the rack (12) are on the side facing away from the adjustable wedge member (14). The adjuster cylinder (20) is a small cylinder. Around the outside of the cylinder is a helix shaped gears. Through the center of the adjuster cylinder 20) is a cylindrical hole. The bolt (24) is adapted to fir inside this cylindrical hole in the cylinder (20). The bolt (24) is longer than the adjuster cylinder (20; and is threaded at one end. The rack (18), adjuster cylinder (20 , and the bolt (24) fit in the body member (22). The rack (18) and adjustable wedge member (14) pieces is glideably accomodated by the body member (22). Just above the teeth portion of the rack (10), the body of the rack (10) has a convex surface on both sides. This is adapted to fit in a grove (26) in the body member the shape of which can be seen in FIG. 2. Figure one shows the position of the adjustable cylinder (20) in the body member. A rectangular opening (28) slightly larger than the adjustable cylinder (20) is made in the center of the body member (22) as shown in figure one. The adjustable cylinder (20) is placed in the rectangular hole (28) and the bolt (24) is placed through the hole in the center of the cylinder. The bolt (24) is adapted to fit through the cylindrical hole (30) and hold the adjustable cylinder in place. The threads on the bolt are adapted to match the threads on the body member (22) to hold the bolt (24) and the adjustable cylinder (20) tightly in place. The helix threads of the adjustable cylinder (20) are designed to mesh with the teeth on the rack (18) so that when the adjustable cylinder (20) is turned, the rack (18) and the adjustable wedge member 14 moves. The above description of the preferred embodiment basically describes a rack and adjustable cylinder for moving the wedge. The wedge could be adjusted by many other ways known in the art. E. M. Norman U.S. Pat. No. 3,286,561, Nov. 22, 1966 and Carlmark, U.S. Pat. No. 4,653,357, Mar. 31, 1987 shows means of adjustment that could be used in this invention. There are numerous other ways known in the art.

In operation the adjustable wedge separator is adjusted to a proper size and it is placed in the position between spindle collar and the ball joint. The wedge is then driven between the spindle collar and the ball joint. As the wedge is driven it separates the ball joint from the spindle collar.

Figure 6:
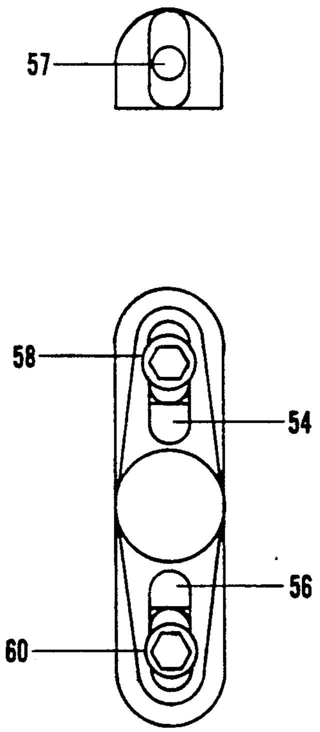
FIG. 6 shows the end view of another embodiment of the invention.
Figure 5:
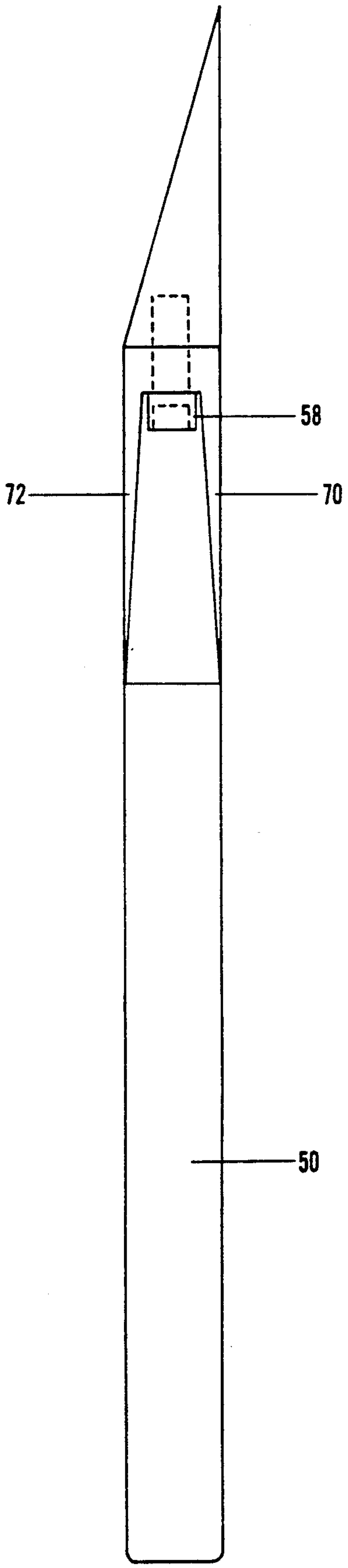
FIG. 5 shows the side view of another embodiment of the invention.

FIG. 5, 6 and 7 show another embodiment of this invention. In these figures both the wedges of the adjustable wedge separator are adjustable. FIG. 5 shows that as in the previous embodiment this invention has a handle 50 that is cylinderical. Integrally attached to the handle is a body member 52 that is a flat trunkcated triangular shaped member. As in the previous embodiment the handle and the body member are made of metal. However, any suitable hard, sturdy non-flexible substance that can be pounded with a hammer or twisted can be used. The handle 50 is attached to the body member on the narrow end. The preferred embodiment the handle 50 is integral molded into the body member 52 until they become one piece; however, the handle 50 could be welded to the body member 52 or attached to the body member 52 by any other methods that would allow the connection to take forces applied by hammering the opposite end of the handle and by rocking it to separator ball joints from spindles.

In FIG. 7 one can see that the body member 52 is slotted. The body member has two elliptically elongated slotts on opposite side of the handle that extends through the body member. Bolts 58 and 60 are placed through the slotts 54 and 56 respectily. These bolts are long enough to pass through the body member and are adapted to fit in the threaded bottom of the adjustable wedge members 64 and 65. FIG. 6 shows the shape of the adjustable wedges. These wedges basically have a flat bottom that is equal in width to the widths of the body member and they taper to a point. FIG. 7 show the bottom view of the wedges. The bottom of the wedges have a opening 57 that is threaded and is adapted to threadly engaged bolts 54 and 56. FIG. 6 shows the side view of the invention. Both side are the same. FIG. 6 also shows that the body member has reinforcement members 70 and 72 on sides of the bolt and slot.

In operation this embodiment of the adjustable wedge separator is adjusted by loosening one of the bolts 58 or 60 that run through the body member 52 and into the adjustable wedge 64 or 66. Moving the adjustable wedge and retighting the bolt 58 or 60. Both adjustable wedge members 64 and 66 can be adjusted in this fashion.

Although two embodiments of this invention has been illustrated and described, it is to be understood by one skilled in the art that numerous changes and modification can be carried out specifically in the embodiment shown and described without departing from the spirit and scope of the claimed invention. Accordingly, that scope of the invention is intended to be limited only by the scope of the appending claims.

What is claimed is:

1. An adjustable forked wedge separator comprising:
   a. a handle; and,
   b. a body member attached to the handle; and,
   c. a fixed wedge member and said fixed wedge member has a thick end that is attached to the body member on the opposite side of the handle and said fixed wedge member tapers to a thin edge; and,
   d. an adjustable wedge member and said an adjustable wedge member have a thick end that is in contact with the body member on the opposite side of the handle and said adjustable wedge member tapers to a thin edge; and,
   e. a means for adjusting the adjustable wedge member so that the distance between the adjustable wedge member and the fixed wedge member can be varied.

2. An adjustable forked wedge separator comprising:
   a. a handle; and,
   b. a body member attached to the handle; and,
   c. a first wedge member and said first wedge member has a thick edge that is attached to the body member on the opposite side of the handle and said first wedge member tapers to a thin edge; and,
   d. a second wedge member and said second wedge member has a thick edge that is attached to the body member on the opposite side of the handle and said second wedge member tapers to a thin edge; and, e. a means for adjusting the first wedge member so that the distance between the first and the second wedge members can be varied.

3. An adjustable wedge separator as in claim 2 wherein:

a. the first wedge member can be attached to the body member at several points, so that the distance between the first wedge member and the second wedge member can be varied.

4. An adjustable wedge separator as in claim 3 wherein:

a. the second wedge member can be attached to the body member at several points so that the distance between the second wedge member and the first wedge member can be varied.

5. An adjustable wedge separator comprising:

a. a handle; and, b. a body member attached to the handle and said body member is a flat truncated triangular shaped member; and, c. a first wedge member and said first wedge member has a thick end that is attached to the body member on the side opposite the handle and said first wedge member tapers to a thin edge; and, d. a second wedge member and said second wedge member has thick end that is attached to the body member on the opposite side of the handle and said second wedge member tapers to a thin edge; and, e. a means for adjusting the first wedge member so that the distance between the first wedge and the second wedge can be varied.

6. An adjustable forked wedge separator comprising:

a. a handle; and, b. a body member attached to the handle; and, c. a first wedge member and said first wedge member has a thick end that is attached to the body member on the side opposite the handle and said first wedge member tapers to a thin edge; and, d. a second wedge member and said second wedge member has thick end that is attached to the body member on the opposite side of the handle and said second wedge member tapers to a thin edge: and, e. a rack is attached to the second wedge member; and, f. a cylinder with a helix shaped gear around the outside and said cylinder is attached to the body piece in a way to allow it to rotate, whereby when the cylinder is rotated the helix shaped gear on the outside of the cylinder engages the rack and moves the second wedge member so that the distance between the first and second wedge members can be varied.

7. An adjustable forked wedge separator, comprising:

a. a handle; and, b. a body member attached to the handle; and, c. a first wedge member and said first wedge member has a thick end that is attached to the body member on the side opposite the handle and said first wedge member tapers to a thin edge; and, d. a second wedge member and said second wedge member has thick end that is attached to the body member on the opposite side of the handle and said second wedge member tapers to a thin edge; and, e. a means for adjusting the first wedge member so that the distance between the first wedge and the second wedge can be varied, f. a second means for adjusting the second wedge member so that the distance between the first and second wedge member can be varied.

8. An adjustable forked wedge separator comprising:

a. a handle; and, b. a body member attached to the handle; and, c. a first wedge member and said first wedge member has a thick end that is attached to the body member on the side opposite the handle and said first wedge member tapers to a thin edge; and, d. a second wedge member and said second wedge member has thick end that is attached to the body member on the opposite side of the handle and said second wedge member tapers to a thin edge; and, e. an elongated slot that extends through the body member; and, f. a bolt which is of sufficient lengths to pass through the body members; and, g. a threaded opening in the bottom of the first wedge member adapted for said bolt to fit within whereby the first wedge member can be held in place by placing the bolt through the body member and into the threaded opening in the bottom of the wedge member and tighten the bolt so that the first wedge member can be tighten down on the body member at several points and thus varying the distances between the first wedge member and the second wedge member.

9. An adjustable forked wedge separator as in claim 8 further comprising:

a second elongated slot that extends through the body members; and, b. a second bolt which is of sufficient lengths to pass through the body members; and, c. a threaded opening in the bottom of the second wedge member adapted for said second bolt to fit within whereby the second wedge member can be held in place by placing the second bolt through the body member and into the threaded opening in the bottom of the second wedge member and tighten the second bolts so that the second wedge member can be tighten down on the body member at several points and thus varying the distance between the second wedge member and the first wedge member.

* * * * *